US005865522A

United States Patent [19]

Gold

[11] Patent Number: 5,865,522

[45] Date of Patent: Feb. 2, 1999

[54] PORTABLE SECURE PROJECTION VIEWING SYSTEM

[75] Inventor: Ronald S. Gold, Fullerton, Calif.

[73] Assignee: Raytheon Company, Lexington, Mass.

[21] Appl. No.: 984,937

[22] Filed: Dec. 4, 1997

[51] Int. Cl.[6] .......... G03B 21/14

[52] U.S. Cl. .......... 353/102; 353/119; 353/122

[58] Field of Search .......... 353/7, 11, 12, 353/13, 14, 79, 97, 121, 122, 101, 102, 119; 359/462, 471, 472, 476, 477; 434/38, 44, 69

[56] References Cited

U.S. PATENT DOCUMENTS

| | | | |
|---|---|---|---|
| 4,329,019 | 5/1982 | Okoshi et al. | 353/7 |
| 5,418,584 | 5/1995 | Larson | 353/122 |
| 5,502,481 | 3/1996 | Dentinger et al. | 353/7 |
| 5,658,063 | 8/1997 | Nasserbakht | 353/122 |

OTHER PUBLICATIONS

Stereo monitors put images in perspective, World New: Optics, Detectors, and Imaging, *Laser Focus World*, Oct. 1989, p. 41.

Steve Wixon, "Three–dimensional presentions", *Information Display*, vol. 7&8, 1989, pp. 24–26.

Warren J. Smith, *Modern Optical Engineering*, McGraw–Hill Book Company, 1966, pp. 123–125 and 212–213.

*Primary Examiner*—William Dowling
*Attorney, Agent, or Firm*—Leonard A. Alkov; Glenn H. Lenzen, Jr.

[57] ABSTRACT

A system for portable secure viewing of an image having the added advantage of presenting true three-dimensional imagery is disclosed. In operation the system is brought to a viewing location where it is opened up, configured and activated. Upon activation, an image is provided by an image source to an image projector which projects the image through a projecting lens focusing the image upon a transmissive field lenses or reflective field screens which in turn provide the image to a pupil locations. A viewer resident at the pupil location is able to see the image projected while others cannot. After viewing is completed, the system is turned off and closed for transportation. The system can then be moved to a second location providing additional secure viewing.

13 Claims, 8 Drawing Sheets

38
20
52
3
52
54
54
3
72
28

PORTABLE SECURE PROJECTION VIEWING SYSTEM

BACKGROUND OF THE INVENTION

1. Field of the Invention

The present invention relates to a portable system for secure viewing of images. The system is also capable of providing true three-dimensional imagery.

2. Description of the Related Art

The coming of the information age has lead to an increase in the development and presentation of information. Additionally, this has lead to a rise in the production of confidential, proprietary and classified information. Due to its very nature, such information must be controlled and its presentation limited to its intended audience. To date, such control has been accomplished by a variety of techniques, including for example, presentation at specially designed and secured "secure facilities." While the use of a secure facility solves the problem as only those intended to view the information are admitted, it provides little flexibility, requiring the viewer to come to it. Additionally, such facilities are quite costly, requiring special emanation control equipment and special construction techniques.

As a result of the limited success of secure facilities, a variety of secured viewing techniques have been developed. Such techniques include polarization and direct viewing, see, see *Stereo Monitors Put Images in Perspective,* Laser Focus World, 41, October 1989, and S. Wixson, *Three-dimensional Presentations,* Information Display, 24–26, July/August 1989. Both techniques are location independent in that they can be adapted to a variety of devices including portable systems. While these techniques do provide greater flexibility and lower cost, they each suffer from their own security limitations. For example, in a polarized system, a viewer is required to wear a set of polarizing glasses in order to view the image provided by a special polarized system. While a person not so equipped could not correctly see the image, a second person similarly equipped can. As for direct viewing, the viewer must be located directly in line with the viewing screen in order to see the image. While this too is better then an unprotected system, anyone located in line or directly adjacent to the viewer could see the image, or a portion of it. In addition to the security limitations, both the polarized and direct viewing systems are further limited in that they are only capable of providing two-dimensional, or at best, pseudo three-dimensional imagery to the viewer.

SUMMARY OF THE INVENTION

The present invention is directed to a portable system for providing limited audience viewing of imagery. The invention can be used in a variety of situations, ranging from presentations of classified or personal information to situations in which viewing of three-dimensional imagery is desirable.

In operation the portable unit is "opened up" by positioning a reflective field screen into an operational position. A series of one or more image projectors are also positioned such that their image or focus is located within the plane of the corresponding field screen. After setup, the system is activated with an image source providing images to an image projector which in turn provides the images to a projection lens which focuses the images onto the field screen. The images received by the field screen are then reflected to a pupil location. A viewer situated at the pupil location sees the images while others sitting adjacent to the viewer cannot. After viewing is completed, the system is turned off. The image projector is positioned back into its storage location and the field screen returned to its closed position. The system can then be moved to other locations for additional secure viewing.

The invention is also directed to a system for viewing true three-dimensional images. In a preferred embodiment, the projection of three-dimensional images is accomplished by the use of two image projectors, a right and a left. Internally within the image source is software that generates a right and left eye view of the image. The image source provides the right image projector with a right eye view and the left image projector with a left eye view of the image. These images are projected onto one or more reflective field screens which direct the image to respective right and left pupil locations for secure three-dimensional viewing.

In a another embodiment, the reflective field screen is replaced with a transmissive field lens. This system transmits the image to the viewer rather than reflecting it. This system, like those discussed above, is capable of providing both singular and dual pupil viewing as well as two and three-dimensional imagery.

These and other features, aspects and advantages of the invention will be apparent to those skilled in the art from the following detailed description, together with the accompanying drawings.

DETAILED DESCRIPTION OF THE INVENTION

The present invention is for a portable system for providing secure viewing of images, with the added capability of presenting true three-dimensional imagery.

Figure 1:
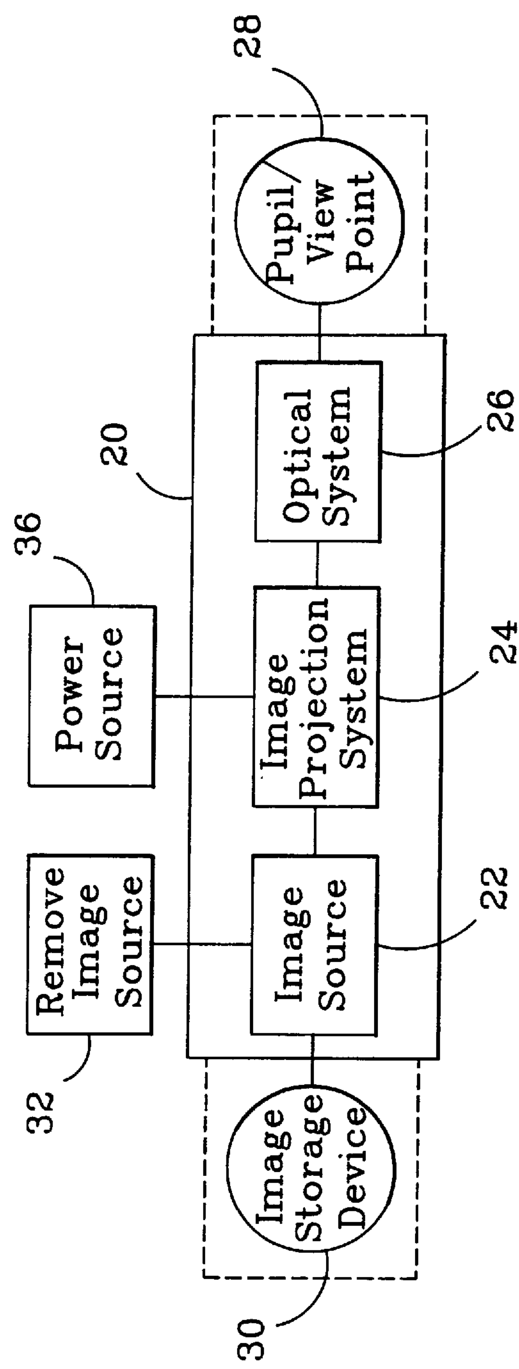
FIG. 1 is a block diagram of the invention.

The invention, as depicted in FIG. 1, consists of a portable housing 20. Mounted within housing 20 is an image source 22 which is connected and provides images to one or more image projectors 24 which are affixed to housing 20. Projector 24 receives images from image source 22 and in turn projects them through an optical system 26 to a specific location in space, commonly known as a "pupil" 28. A person whose eye is located at pupil 28 is able to view the image projected by projector 24, while others adjacent to the viewer cannot.

While image source 22 can be completely autonomous, capable of generating its own images, source 22 can have resident within, or connected to it, a variety of image storage devices 30. Such devices can include, among others, data or graphic disk systems such as CD-ROM. Source 22 can also receive images from remote locations 32 which can be supplied by a variety of methods, including among others, telephone, communication lines, radio, or the like. Source 22 can also be operated as a "dumb terminal" receiving images or textual data from remote sources 32, in turn providing these images to image projector 24.

Contained within housing 20 is one or more internal power sources (not shown). These sources, commonly batteries, are used to power the invention. Operational power can also be supplied to the invention by a variety of remote power sources 36, which include among others, standard house hold electricity or solar panels. Remote source 36 can also be used to charge power source to permit further autonomous operation.

Figure 2:
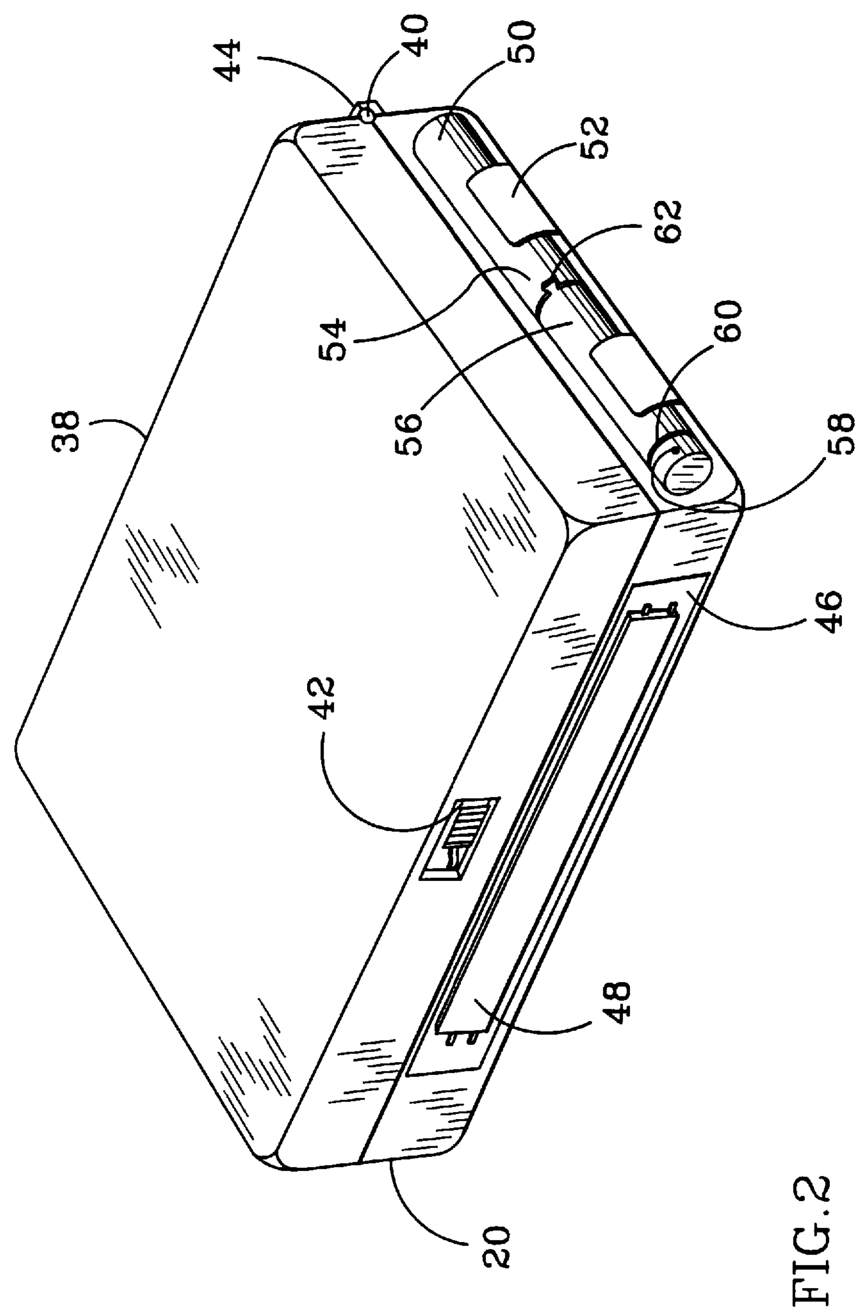
FIG. 2 is a perspective view of one embodiment of the invention in a closed, transport configuration.

Since the invention is portable it is generally found in one of two configurations; in a closed or transport configuration, or in an open or operational configuration. FIG. 2 depicts one embodiment of the invention in the closed or transport configuration showing a reflected field screen 38 attached to housing 20 by a bottom or rear hinge 40. Hinge 40 allows screen 38 to rotate, placing it in its open, operational configuration. At the top or front of screen 38 is a slidable latch 42 which is used to keep screen 38 in its closed or transport position. Along the bottom or rear of housing 20, adjacent to hinge 40, is located a screen stop 44 which is used to place screen 38 in its proper orientation for operation.

Attached to the front of housing 20 is a handle 46 which is used as a carrying device for the system. FIG. 2 shows handle 46 in its closed or retracted position. When used for carrying, handle 46 is pulled out from its retracted position exposing a strap 48 which is grasped and held by the carrier.

Attached to both the right and left sides of housing 20 are one or more flexible articulated arms 50. FIG. 2 shows arm 50 in its stowed, horizontal position for transportation. Arm 50 is held in this position by a series of one or more clasps 52. Arm 50 consists of a first front section 54 and a second aft section 56. Located at the base of aft section 56 is a pivot pin 58 around which arm 50 is pivoted from its stowed horizontal position to a vertical, operational position. Adjacent to pin 58 is a rotatable coupler 60 which allows arm 50 to be rotated around its longitudinal axis. At approximately the mid point of arm 50 is a pivoting knuckle 62 which connects sections 54 and 56. Knuckle 62 allows section 54 to be pivoted from an initial vertical position to an operational position. Pin 58, coupler 60 and knuckle 62 each contain two locking detents 64 (not shown). The first detent 64 corresponds to the proper orientation of each section for transportation, the second detent 64 corresponds to a proper orientation for each section for system operation.

While a variety of field screens 38 can be used, a Fresnel screen or a holographic screen is preferred. Exact geometries of screen 38 can vary depending on size and shape of the pupil 28 desired. The number of field screens 38 necessary is generally a function of the number of image projectors 24 utilized. Thus, if two image projectors 24 are used, two screens 38 are required. However, if a nested Fresnel field screen 38 is used a single screen 38 can be utilized in place of two. Or if a holographic screen 38 is used a single screen 38 can also be utilized. That is the screens can overlap, the images being separated by the angle of the projected light.

Field screen 38 can also be coated with an assortment of films or coatings. These films are provided for a variety of reasons ranging from production of holographic images to anti-reflection coatings to minimize glare produced by ambient light. Such films or coatings are known by those skilled in the art.

Figure 3:
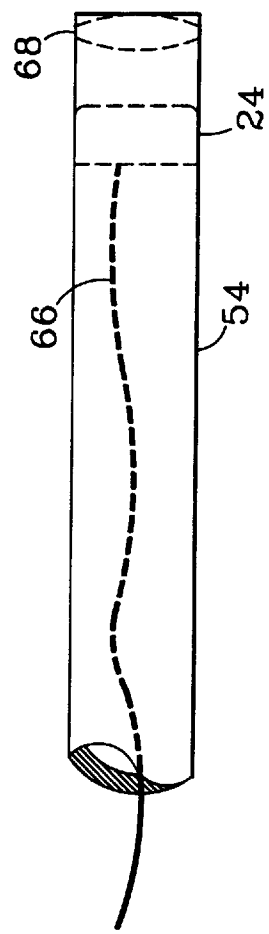
FIG. 3 is a partial sectional view of the front section of a flexible articulated arm taken across section lines 3—3 of FIG. 6.

As shown in FIG. 3, housed within arm section 54 is image projection system 24 which can consist of a wide variety of projection devices, and are preferably flat panel displays. Such displays can include, among other, cathode ray tubes (CRT), liquid crystal displays (LCD), or field emission displays (FED). System 24 is connected to image source 22 by the appropriate connecting devices 66 required for system 24. For example, if system 24 is a CRT display, it is connected to source 22 by a series of electrical connections. However, if system 24 is an LCD display, an additional fiber optic cable is required between it and source 22 to provide illumination light for the display. Adjacent to system 24 is one or more projection lenses 68 which are used to project the image produced by system 24 upon field screen 38. Projection lens 68 can be a variety of devices which are commonly known to those skilled in the art.

Figure 4:
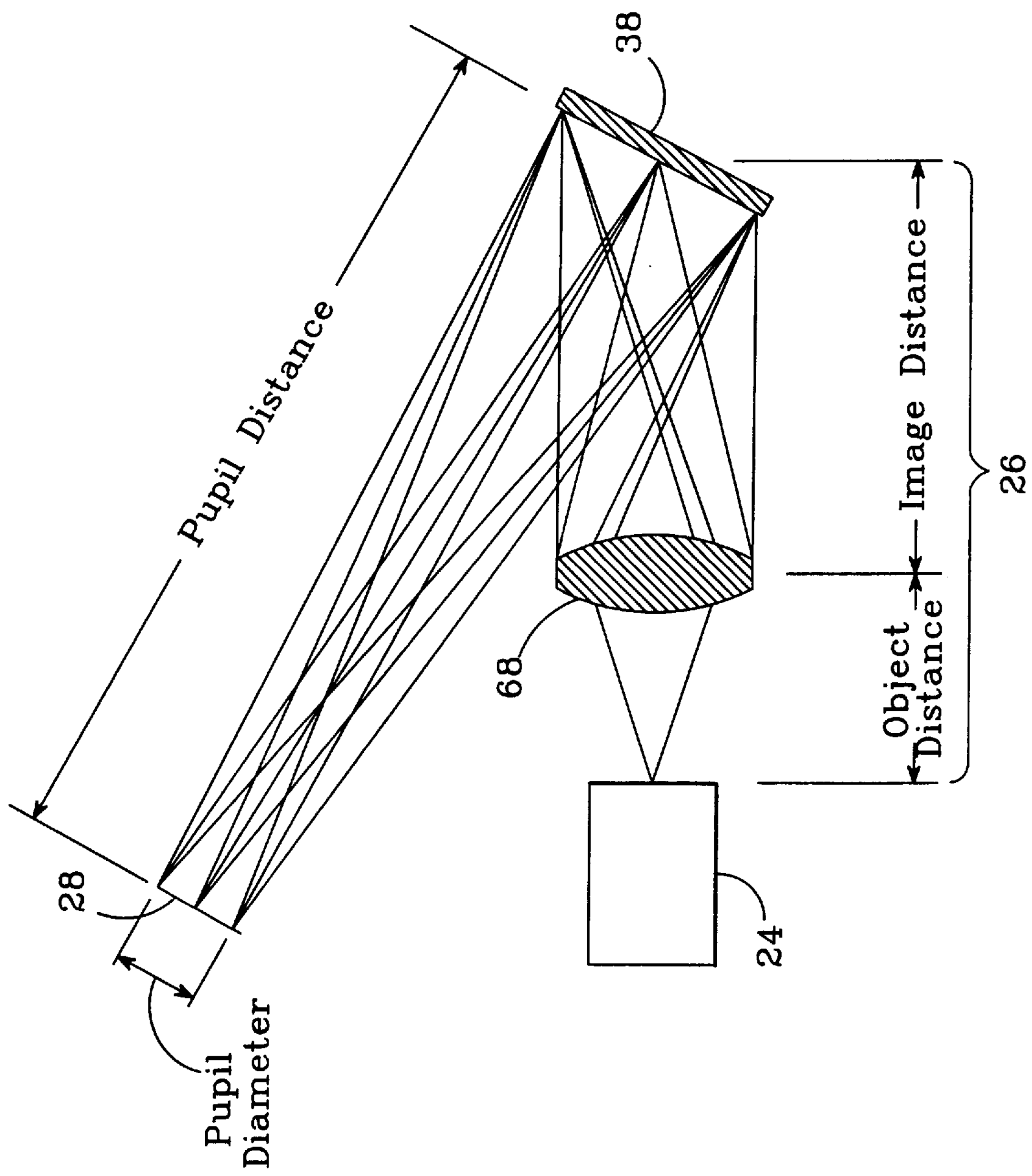
FIG. 4 is a schematic of the prior art optical system used in the invention.

The orientation of the optical components of optics system 26 is quite important, for if screen 38 is located at the image or focus of projection lens 68, an image will be reflected to a defined location in space, the pupil location 28, where it can be viewed (see FIG. 4). A person whose eyes are located at the pupil location 28 can see the image. However, a person located at a site other than the pupil location could not, and at best would see only scattered light. Such an optical system is known by those skilled in the art, see W. J. Smith, *Modern Optical Engineering,* pp 123–125 & 212–213.

The relative locations between the optical elements of system 26 determines the size and location of pupil 28. For the generation of a pupil 28 the locations of projection lens 68, field screen 38 and pupil 28 can be determined by the following equations:

$$\frac{1}{\text{Object Distance}} + \frac{1}{\text{Image Distance}} = \frac{1}{\text{Focal Length of Projection Lens 68}} \qquad (1)$$

where:

Object distance=the distance between image projection system 24 and projection lens 68;

Image distance=the distance between projection lens 68 and field screen 38;

Focal Length of Projection Lens 68=the distance principle point and the focal point.

Pupil distance=the distance between field screen 38 and pupil location 28;

d=diameter of pupil;

M=Magnification of image source at field lens/screen; and $(f/no)_s$=Object distance/projector 68 aperture.

The location of lens 26 relative to the field screen 38 is important as it is to be located at the image or focus point of lens 68. However, if this is not possible, a series of one or more intermediate optical devices (not shown) can be used to provide the focus of lens 68 at field screen 38. While image projector 24 and projection lens 68 can be separate devices they can also be integrated into a singular device. For simplicity, the remainder of the discussion will use projector 24 as inclusive of projection lens 68, treating the devices as integrated, all the while acknowledging that a non-integrated system is also contemplated and is fully capable of performing the same function.

Figure 5:
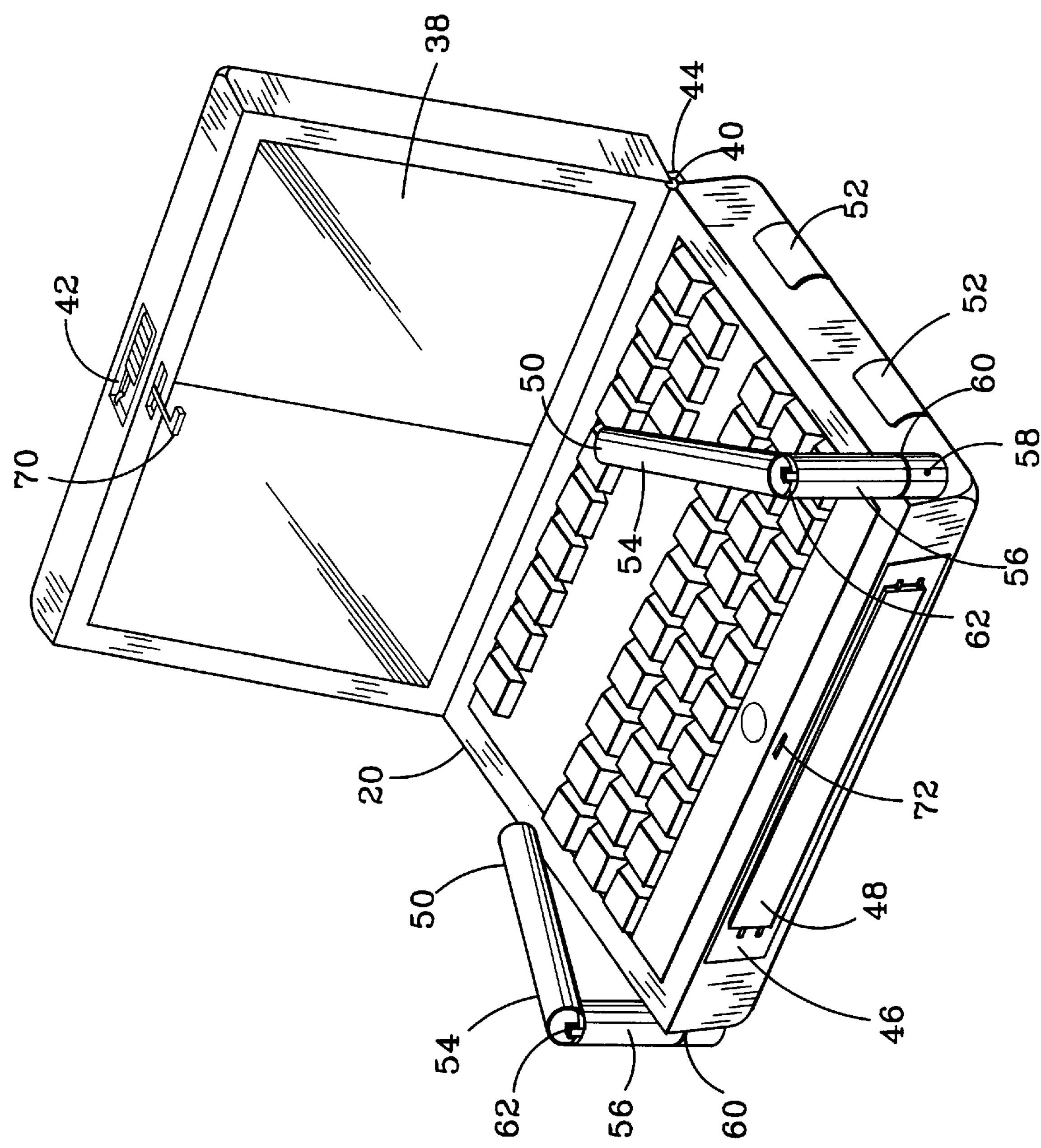
FIG. 5 is a perspective view of one embodiment of the invention in an open, operational configuration.

FIG. 5 shows the invention in its open or operational configuration. To operate the system, a user first places housing 20 upon a suitable surface which can range from a desk or table top to the users lap. A user would then unlatch screen 38 from housing 20 by sliding latch 42. The moving of latch 42 unhooks catch 70 from slot 72 freeing screen 38, allowing it to rotate around hinge 40. Screen 38 is then pivoted around hinge 40 until the back edge of screen 38 contacts screen stop 44.

The user would then orient arm 50 in relation to screen 38, this is first done by releasing arm 50 from clasp 52 and its corresponding first detent 64. Arm 50 is then rotated around pivot pin 58 until it is locked into a vertical position by its second detent 64. Arm 50 is then rotated around its longitudinal axis by coupler 60 until its corresponding second detent 64 is reached where it too is locked into position. Arm 54 is then pivoted around knuckle 62 from its vertical orientation until it reaches its second detent 64 where it is locked into position. If the system is a dual projection systems, a second arm 50 is oriented relative to screen 38 in the same manner as the first arm 50.

After configuration the system is activated with image source 22 providing an image to projection system 24 which in turn projects the image through projection lens 68 to screen 38. The image received by screen 38 is reflected back to pupil 28 for viewing.

Figure 6:
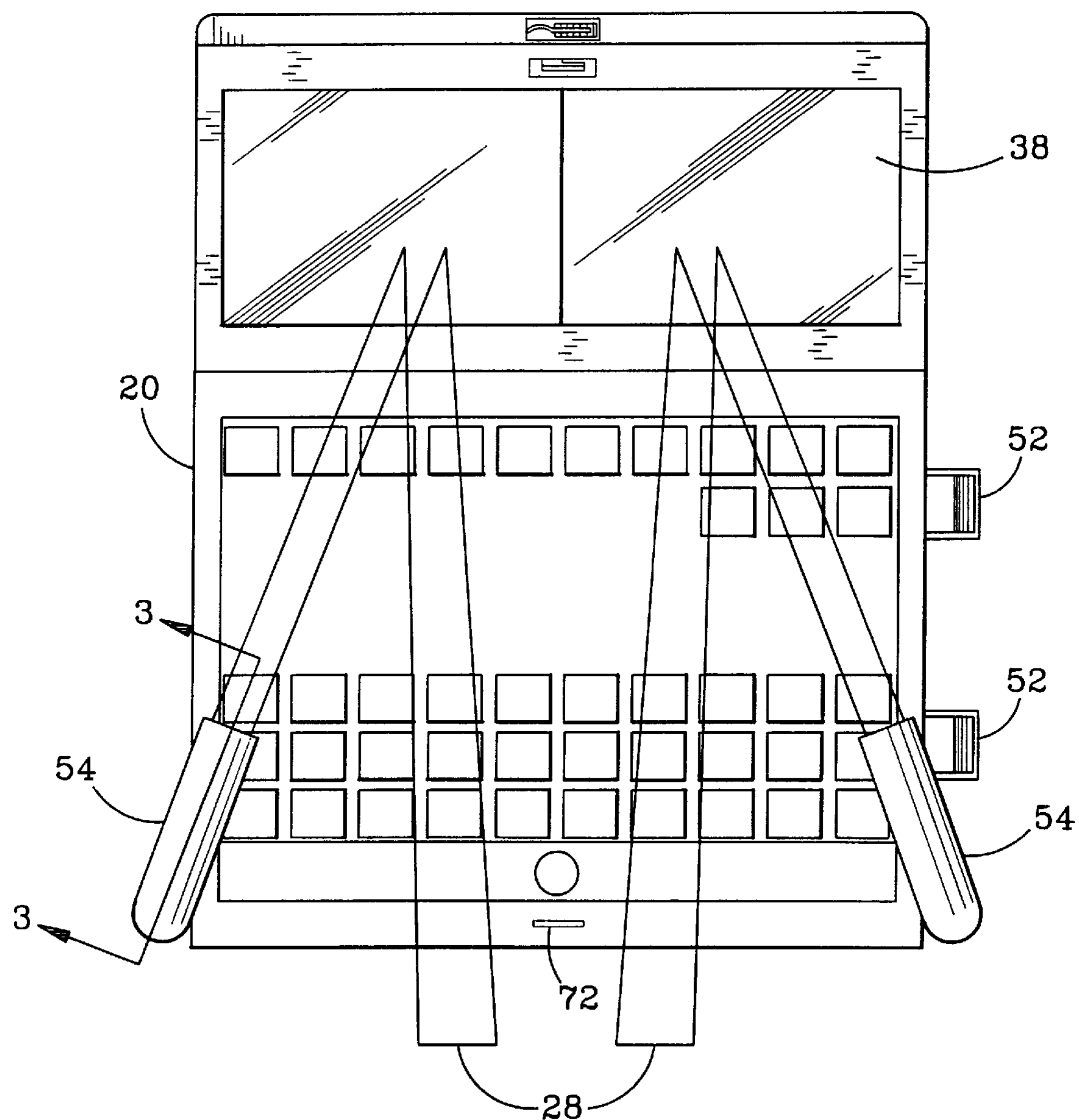
FIG. 6 is a plan view depicting the generation of dual pupils by the use of a reflective field screen for three-dimensional viewing.

The invention is preferably suited for the generation of dual pupils 28. This is achieved by using two projectors 24 each interacting with a corresponding field screen 38 (see FIG. 6). With this configuration the system generates two pupils 28 located at a defined position in space. These pupils are preferably located on the same horizontal plane and separated by approximately 6 to 7 cm. This separation is known as interpupillary distance and corresponds to the average distance between a viewer's eyes. A viewer placing his/her eyes at these pupil locations sees the image in a binocular mode.

Figure 7:
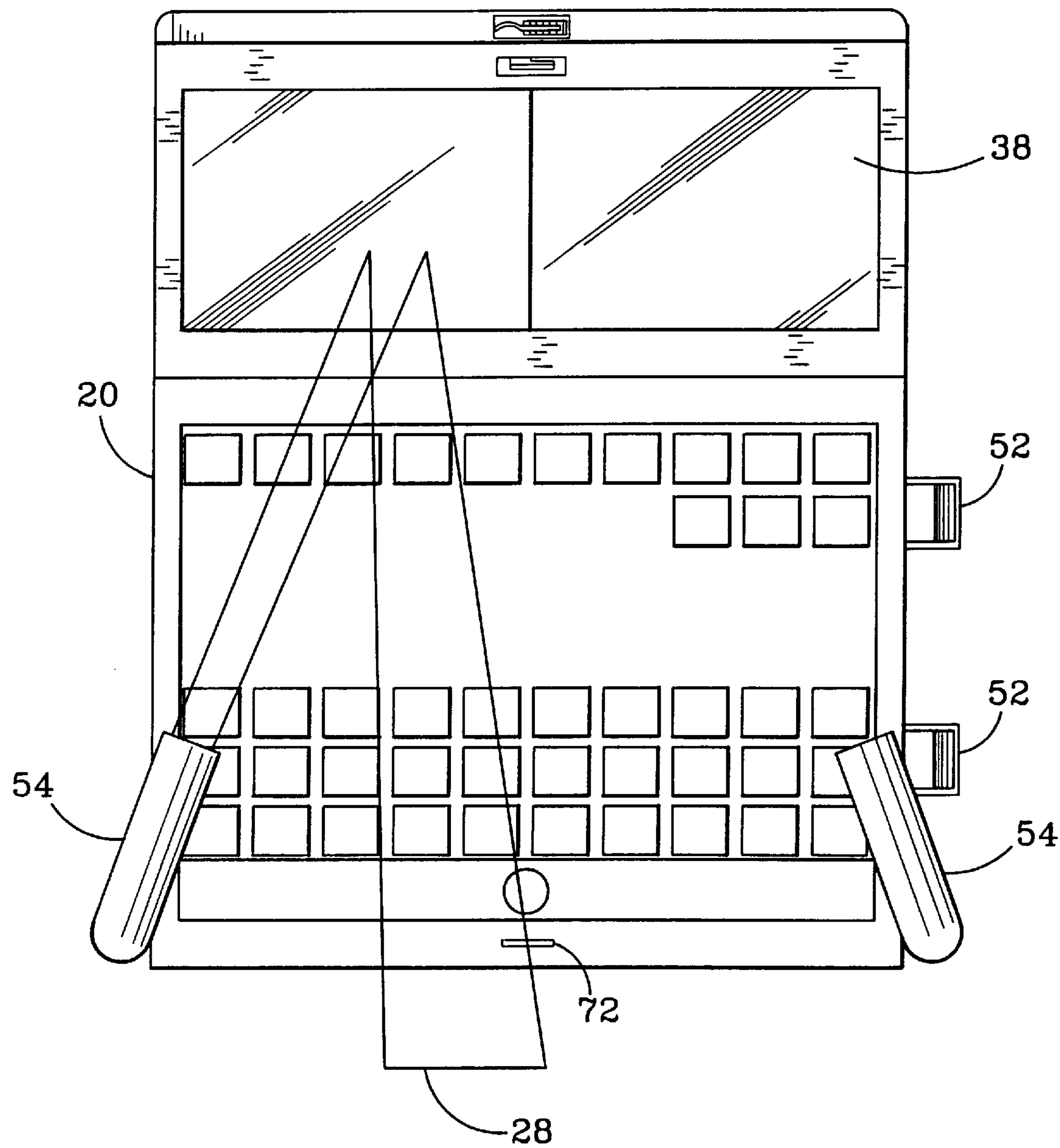
FIG. 7 is a plan view depicting the generation of a single pupil by the use of a reflective field screen.

While the invention preferably consists of two image projectors 24 coupled with two field screens 38, the use of a single image projector 24 and a single field screen 38 is also possible (see FIG. 7). However, this approach results in the generation of a single pupil 28. As the size and shape of pupil 28 is directly related to the geometric configurations of field screen 38 and the pupil distance, a pupil 28 could be generated that is viewed by a single eye, or could be large enough to be viewed by both eyes simultaneously. While such a system can be used for a wide variety of portable secure applications, it is limited to two-dimensions and at best pseudo three-dimensional viewing.

After viewing is completed the system is turned off. Arm 54 is rotated back into a vertical position and locked in place by its corresponding first detent 64. Arm 50 is then rotated about it longitudinal axis by coupler 60 until its first detent is found, locking it. Arm 50 is then pivoted about pin 58 until it is held in place by clasp 52. Screen 38 is then rotated about hinge 40 returning it to its closed position and locking it in place by securing catch 70 into slot 72. At this point the user can extract handle 46, grasping strap 48, and carry the system to a new location.

A second embodiment of the invention is a portable system for presentation of three-dimensional imagery. This is achieved by the use of dual projectors 24 as described previously. However, for the production of three-dimensional imagery a "right eye" and a "left eye" view of the image must be generated by source 20. The right and left eye imagery is generated by software resident within source 20. Such software is commercially available from a variety of sources, for example, Sterographics Inc., San Rafael, Calif. These images are projected by the appropriate right and left image projectors 24 to their respective field screens 38 which in turn provide the images to their corresponding right and left pupil locations 28. A viewer located at the pupil locations 28 would see a three-dimensional image of the item.

Figure 8:
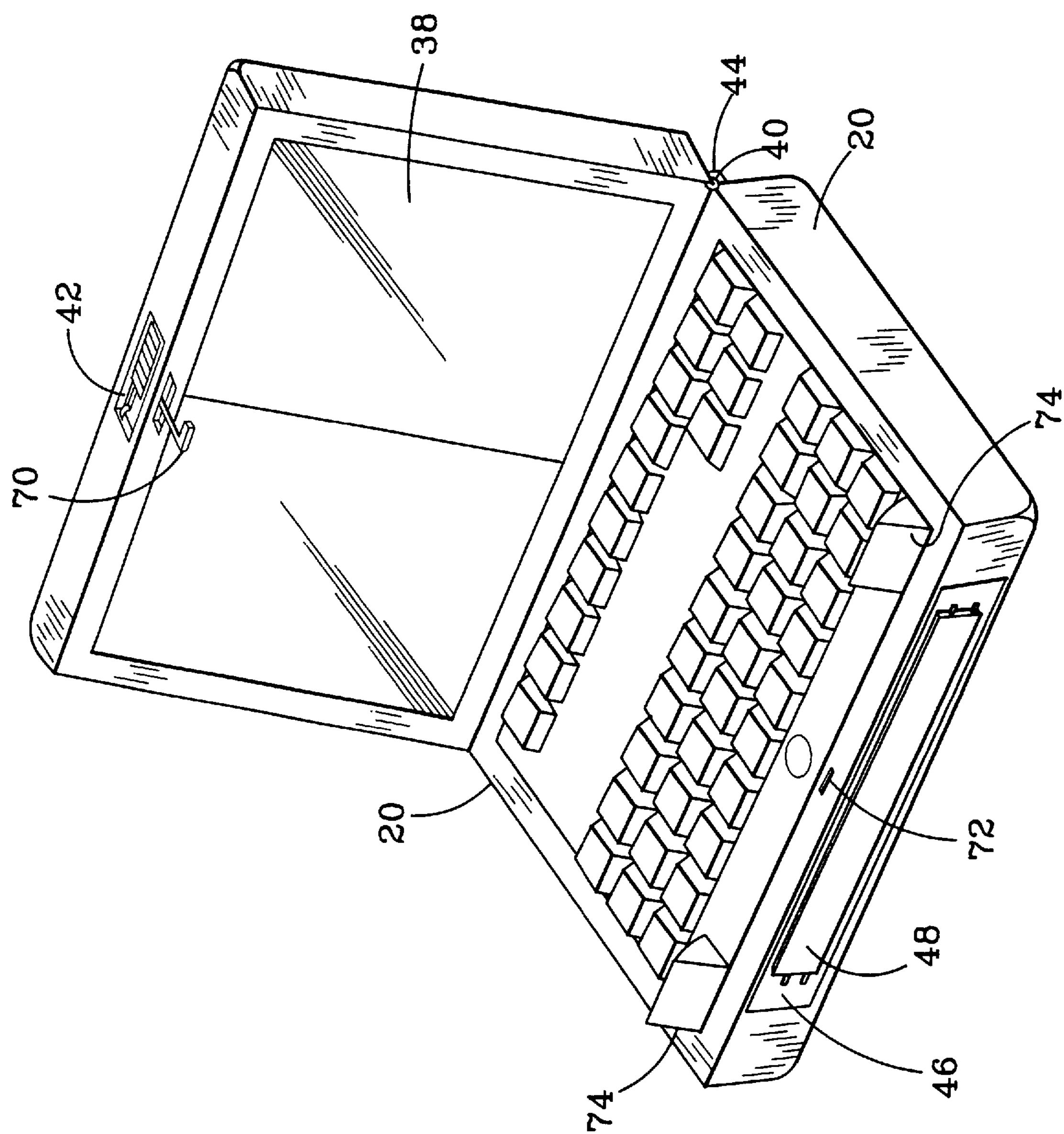
FIG. 8 is a perspective view of a second embodiment of the invention in an open, operational configuration.

In a third embodiment of the invention, as shown in FIG. 8, projector 74 is mounted within housing 20, preferably within the forward corners. This configuration alleviates many of the complexities associated with arm 50 in that projector 74 can be permanently mounted in an operational position. Additionally, this embodiment simplifies projection system 74 in that, among other things, device 66 can be housed within housing 20, no longer requiring it to be run within arm 50. This is especially important if device 66 is a fiber optic cable as excessive bending angles can cause a problem. In operation, the system functions in the same manner as described above in that screen 38 is released and rotated into its operational position defined by stop 44. Once screen 38 has been positioned the system is activated with image source 22 providing an image to projection system 74 which in turn projects the image through projection lens 68 to screen 38. The image is then reflected back to pupil 28 for viewing. After viewing is completed, the system is shut off and screen 38 is closed locking it in place by securing catch 70 into slot 72. This alternate embodiment is capable of providing both singular and dual pupils 28, as well as two and three-dimensional imagery.

Figure 9:
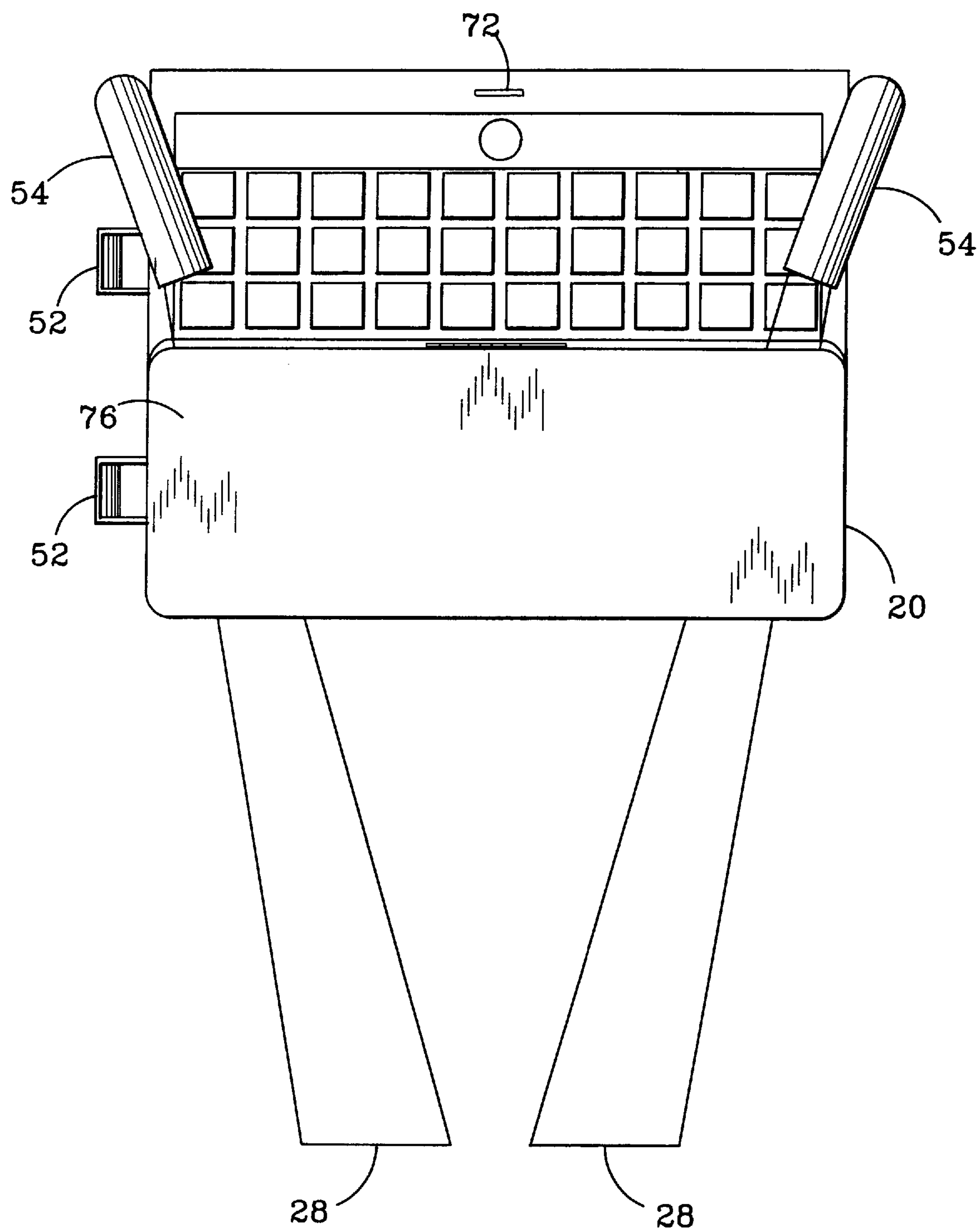
FIG. 9 is a plan view of a third embodiment of the invention depicting the generation of dual pupils for three-dimensional viewing by the use of a transmissive field lens.

In a fourth embodiment of the invention, as shown in FIG. 9, field screen 38 is replaced with a transmissive field lens 76. Like screen 38, the location of lens 76 is important, for if lens 76 is located at the image or focus of projection lens 68, an image will be provided at a pupil location 28. While lens 76 can be a variety of lenses, a Fresnel lens or a holographic lens is preferred. Like screen 38, the number of field lenses 76 required is generally a function of the number of image projectors 54 utilized. Thus, if two image projectors 54 are used, two field lenses 76 are required. However, if a nested field lens 76 is used a single lens 76 can be utilized instead Field lenses 76 can also be coated with an assortment of films or coatings which are provided for a variety of reasons ranging from production of holographic images to anti-reflection coatings to minimize glare produced by ambient light.

In operation, the system functions in the same manner as those described above, with the exception that the image provided from projector 54 is transmitted through lens 76 to pupil 28 rather then being reflected. This embodiment is also capable of providing both singular and dual pupils 28, as well as two and three-dimensional imagery.

Although the present invention has been described in considerable detail with reference to certain preferred embodiments thereof, other versions are possible. Therefore, the spirit and scope of the appended claims should not be limited to their preferred versions contained therein.

I claim:

1. A secure viewing system, comprising:

a portable housing;

an image source in said housing that provides images;

an image projector in said housing which receives images from said image source and projects them to a focus; and a movable optical condenser, affixed to said housing, having an open position in which said optical condenser is located at said focus receiving said projected images and directing said images to a pupil location for individual viewing, and a closed position for transportation.

2. The system of claim 1, wherein said image source further comprises an image generator which produces said images provided by said image source.

3. The system of claim 1, wherein said image source is a computer and wherein resident within said computer is software which produces and provided said image to said image projector.

4. The system of claim 1, including therefor a reflective field screen.

5. The system of claim 4, wherein said reflective field screen is a Fresnel screen.

6. The system of claim 4, wherein said field screen is a holographic screen.

7. The system of claim 1, including therefor a transmissive field lens.

8. The system of claim 7, wherein said transmissive field lens is a Fresnel lens.

9. The system of claim 7, wherein said field lens is a holographic lens.

10. The system of claim 1, wherein said image projector comprises a left image projector for projecting a left eye image to a left pupil and a right image projector for projecting a right eye image to a right pupil, the viewing of both pupils simultaneously providing three-dimensional imagery.

11. The system of claim 1, wherein said image projector further comprises a projection lens which receives images projected by said projector and focuses said image at a point in space.

12. The system of claim 1, wherein said image projector is movably affixed to said housing having an operational position for projecting said image upon said optical condenser and a collapsed position for transportation.

13. The system of claim 1, wherein said image source receives images from an external source.

* * * * *